March 3, 1942. F. H. CULLEN 2,274,889
SMOKE PURIFIER
Filed Sept. 24, 1937 4 Sheets-Sheet 1
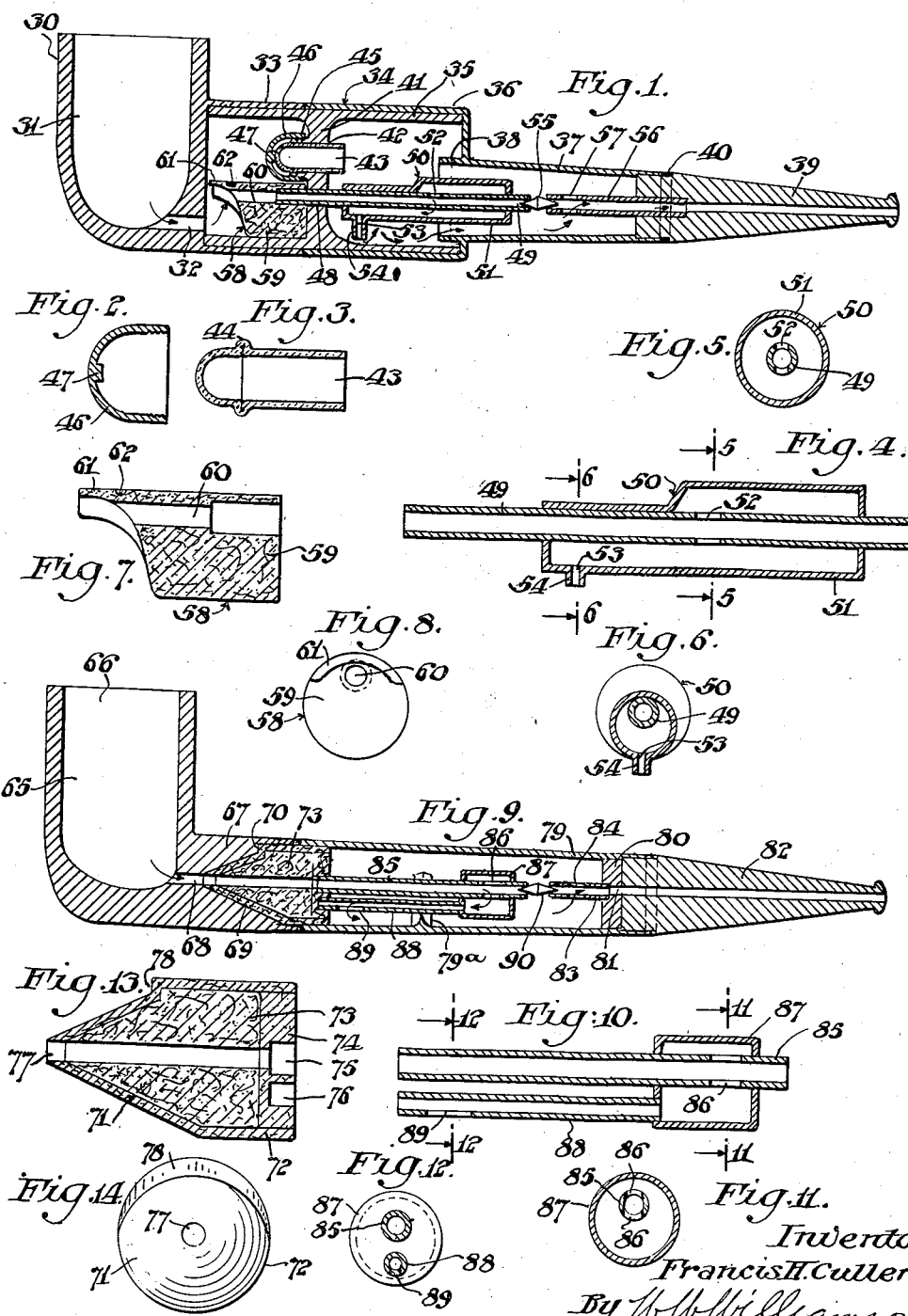

March 3, 1942.  F. H. CULLEN  2,274,889
SMOKE PURIFIER
Filed Sept. 24, 1937   4 Sheets-Sheet 2
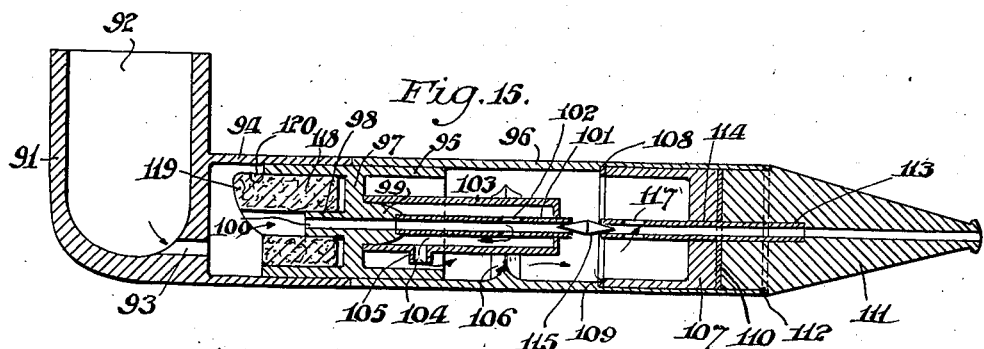
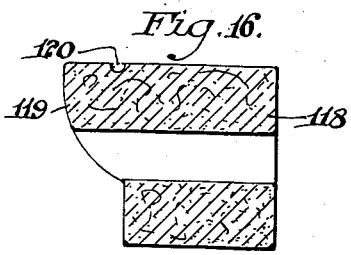
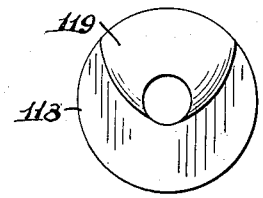
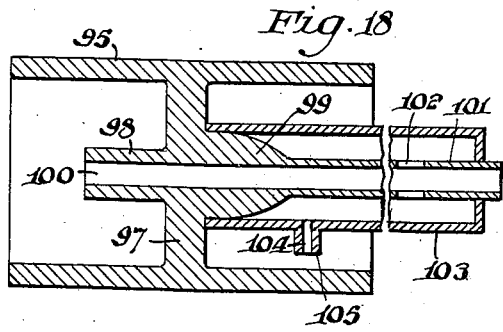
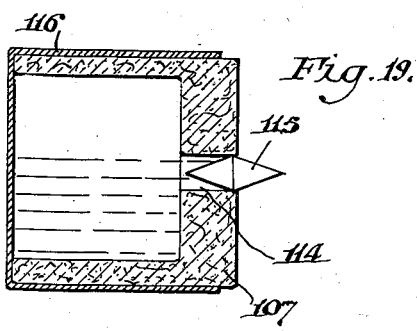
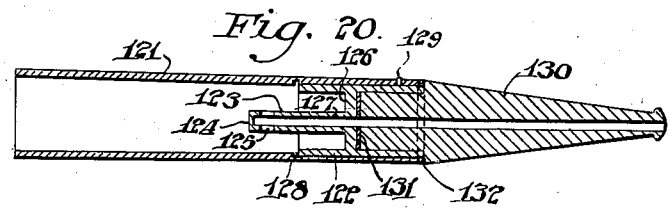
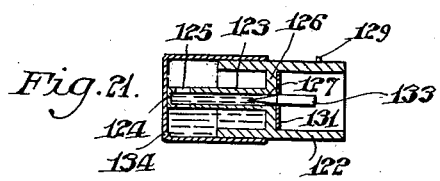
Inventor:
Francis H Cullen,
By W. W. Williamson
Attorney.

March 3, 1942.　　　　F. H. CULLEN　　　　2,274,889
SMOKE PURIFIER
Filed Sept. 24, 1937　　　　4 Sheets-Sheet 3
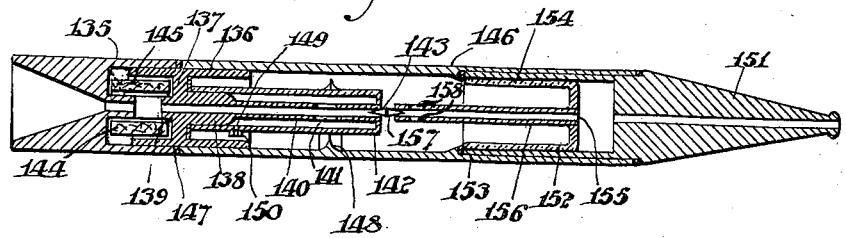
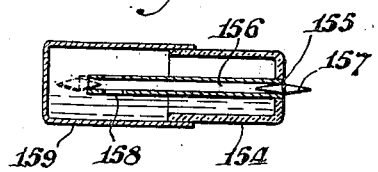
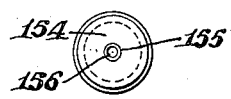
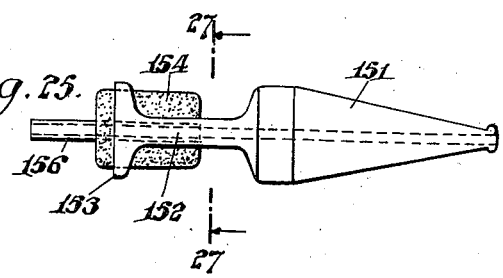
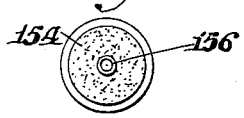
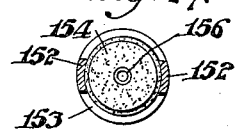
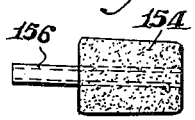
Inventor:
Francis H. Cullen,
By W. W. Williamson
Attorney.

March 3, 1942.  F. H. CULLEN  2,274,889
SMOKE PURIFIER
Filed Sept. 24, 1937  4 Sheets-Sheet 4
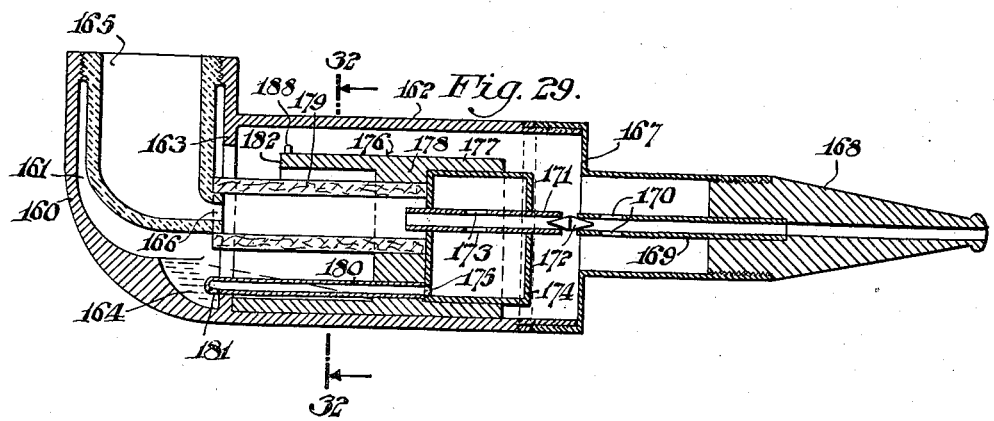
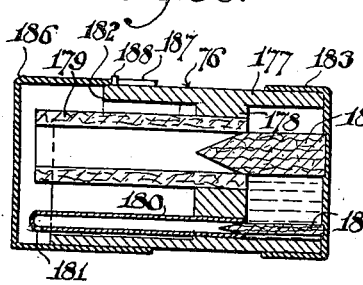
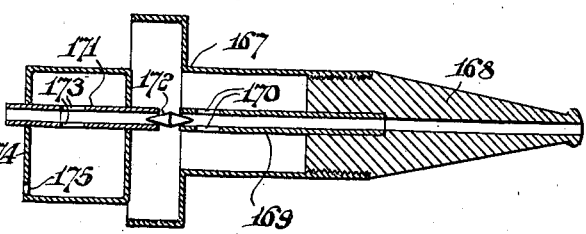
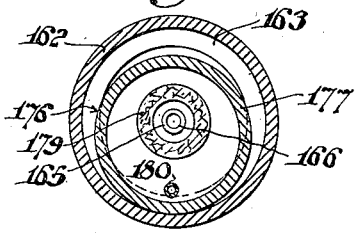
Inventor:
Francis H. Cullen,
By W. W. Williamson
Attorney.

Patented Mar. 3, 1942

2,274,889

UNITED STATES PATENT OFFICE 2,274,889

SMOKE PURIFIER

Francis H. Cullen, Philadelphia, Pa.

Application September 24, 1937, Serial No. 165,451

5 Claims. (Cl. 131—173)

This invention relates to new and useful improvements in a smoke purifier, which may be a part of a tobacco pipe, may be attached to a tobacco pipe, or may be used as a cigar or cigarette holder, and the present application is in part a continuation of my prior co-pending application Ser. No. 98,542, dated August 29, 1936, which has eventuated in Patent No. 2,190,322, February 13, 1940. The purpose of the invention is to provide improved means for absorbing the oils and other objectionable substances from the smoke fumes and in addition to pass the fumes through a liquid bath to further condense, cool, sweeten and purify them so as to prevent tongue burning and biting and give the smoker a pure, cool, sweet smoke.

The general object of the invention is to provide a novel construction of a purifier that holds an absorbent filter cartridge and in addition contains liquid. The exact quantity of the liquid to be put in the purifier may be contained in a cartridge and this cartridge may be put into the body of the purifier and later used to hold the liquid that is drained out of the purifier after it has served its purpose.

Another object of this invention is to provide an absorbent filter cartridge, which may be made, for instance, with paper, or a paper tube filled with absorbent material or any other suitable filtering material.

Another object of the invention is the provision of a refill tube or liquid container or cartridge, which holds the exact quantity of liquid to be put in the purifier, and which may be made of specially treated paper, such as parchment paper, or made of glass, wood, plastic, metal or any other suitable material. For identification purposes, in subsequent remarks, one cartridge will be called the absorbent filter cartridge and the other as the liquid holding cartridge. The purpose of the cartridge that holds the liquid is to enable the smoker to carry it about in his pocket or purse ready for use and to have the cartridge act as a receptacle for the liquid that is to be drained out of the purifier after it has become contaminated by the smoke fumes, the cartridge to be placed in the purifier so that it may be easily removed without soiling the fingers of the smoker and easily capped and sealed so that it may be thrown away without damaging or soiling any article of property.

Another object of the invention is to provide a filter and liquid purifier of one piece construction or combine the necessary separate elements in a unitary structure which may be made of parchment paper to give it lightness and which the smoker may discard if desired by just pulling out the mouthpiece and disengaging the combined absorbent filter and liquid purifier from the tobacco bowl and insert a new combination unit in its place.

Another very important object of the invention is the use of a smoke purifier that is made of a plastic methyl methacrylate polymer called "Lucite," that is in appearance like glass, but is superior in many ways, such as, being lighter in weight and does not break as easily, the purpose of using "Lucite" is that it gives visibility to the operation of the purifier.

With the above and other objects in view which will be apparent from the description, this invention consists of certain structural features and combination of elements hereinafter set forth and then designated by the claims.

In order that those skilled in the art to which this invention appertains may understand how to make and use the same, I will describe a number of variations of the conception referring by numerals to the accompanying drawings forming a part hereof, in which:

Fig. 1 is a longitudinal sectional view of a smoking pipe embodying a novel purifier containing an absorbent filter cartridge and a liquid holding cartridge of this invention operatively disposed in the passage through the pipe stem.

Fig. 2 is an enlarged sectional view of the cartridge holding cap.

Fig. 3 is a similar view of the liquid holding cartridge.

Fig. 4 is an enlarged longitudinal sectional view of the condensing device or cylinder.

Fig. 5 is a section on the line 5—5 of Fig. 4.

Fig. 6 is a section on the line 6—6 of Fig. 4.

Fig. 7 is an enlarged longitudinal sectional view of the absorbent filter cartridge.

Fig. 8 is an end view thereof.

Fig. 9 is a longitudinal sectional view of a smoking pipe illustrating a modification of the invention.

Fig. 10 is an enlarged longitudinal section of the condensing device or cylinder used in connection with that form of the invention shown in Fig. 9.

Fig. 11 is a section on the line 11—11 of Fig. 10.

Fig. 12 is a section on the line 12—12 of Fig. 10.

Fig. 13 is an enlarged longitudinal section of the absorbent filter cartridge for use as shown in Fig. 9.

Fig. 14 is an end view of Fig. 13.

Fig. 15 is a longitudinal sectional view of a smoking pipe showing another arrangement of the elements for carrying out the objects of the invention.

Fig. 16 is an enlarged longitudinal sectional view of the absorbent filter cartridge.

Fig. 17 is an end elevation thereof.

Fig. 18 is an enlarged longitudinal view with a portion broken out of the condensing device for use as shown in Fig. 15.

Fig. 19 is an enlarged longitudinal section of the liquid holding cartridge illustrating the method of sealing the same when not in use.

Fig. 20 is a longitudinal sectional view on a reduced scale of a further modified form of the purifier which may be utilized as a part of a pipe or as a cigar or cigarette holder.

Fig. 21 is a longitudinal section of the liquid holding cartridge shown in Fig. 20 illustrating the manner of sealing the same when containing a liquid.

Fig. 22 is a longitudinal sectional view of a further modification of the purifier and especially showing it adapted for use as a cigar or cigarette holder but not limited to such use.

Fig. 23 is a longitudinal sectional view of the liquid holding cartridge illustrated in connection with Fig. 22 and showing the manner of sealing a liquid therein.

Fig. 24 is an end elevation thereof.

Fig. 25 is a side elevation of the liquid holding cartridge assembled in the mouthpiece as shown in Fig. 22.

Fig. 26 is an inner end view of Fig. 25.

Fig. 27 is a section on the line 27—27 of Fig. 25.

Fig. 28 is a side elevation of the liquid holding cartridge per se.

Fig. 29 is a longitudinal sectional view of another arrangement of the parts constituting the invention.

Fig. 30 is a similar view of the combined filter and liquid holding cartridge capped and with a liquid therein.

Fig. 31 is also a sectional view illustrating the mouthpiece unit withdrawn.

Fig. 32 is a cross sectional view on the line 32—32 of Fig. 29.

In carrying out my invention as herein embodied, reference will first be made to Figs. 1 to 8 inclusive, wherein 30 represents a tobacco bowl of a smoking pipe, which bowl has a tobacco receiving chamber 31 with a draft opening 32 leading therefrom into a purifier chamber partly formed by the tubular projection or element 33 of the purifier housing or casing 34, which element 33 is carried by the pipe bowl 30 either as an integral part hereof or as a separate piece attached thereto.

The purifier includes a sleeve 35 having one end inserted in the housing or casing element 33 and then further enclosed by the other element 36 of the purifier housing or casing 34. At a suitable location in the outer end of the housing or casing element 36 is the pipe stem 37 which may be formed as a part of said housing element 36 or it may be connected therewith in any suitable manner to provide a unitary structure, with the inner end of the stem projecting into the purifier chamber beyond the outer end of the housing element 36, thereby providing a flange 38. A mouthpiece 39 is suitably mounted in the outer end of the stem 37, preferably with a suitable packing means between one or more of the joints as illustrated by the gasket 40.

It being understood that the stem 37 is hollow and the mouthpiece has a bore therethrough, thereby providing a smoke passageway from the pipe bowl to the outer end of the mouthpiece and it is in this passageway that the several parts of my invention are located.

The sleeve 35 is open at both ends and has a partition 41 suitably positioned intermediate the ends thereof. This partition has a hole 42 passing through it for the reception of a liquid holding cartridge 43 which may be produced from any low cost material such as paper and may be constructed in various ways to limit its insertion into the hole 42, and as illustrated of this feature I have shown such cartridge as provided with an external flange 44 which will engage a neck 45 projecting from the partition 41 and surrounding the hole 42, and said neck may be externally threaded to receive the cap 46 having a portion internally threaded for the purpose and when said cap is screwed home, a portion thereof, such as the boss 47 will engage the closed end of the cartridge 43 and thereby clamp said cartridge in place.

This cartridge is designed to initially contain a suitable quantity of water or other liquid to be placed in the chamber at the outer end of the sleeve 35 to function as a liquid seal, through which the smoke from the burning tobacco must pass on its way to the smoker's mouth. In order to facilitate the removal of the liquid after it has become contaminated, the inner surfaces of the sleeve and its partition are slightly rounded or curved to cause the liquid to flow towards the hole 42 when the pipe is held in a vertical position with the stem or mouthpiece uppermost.

Another hole 48 is formed in the partition 41 through which the inner end of a tubular barrel or induction tube 49 is projected whereby its extreme inner end is located within the chamber at the inner end of the sleeve 35 and this barrel 49 forms a part of the condensing cylinder 50, passing entirely through the outer tube 51 and so fashioned as to provide an outer end of smaller diameter and an inner end of larger diameter. The barrel 49 preferably lies against one wall of the outer tube where the latter is of smaller diameter, as plainly shown in Fig. 4 and said barrel and outer tube may be separate pieces assembled and brazed or otherwise fastened together or they may be made as a single casing. The barrel is open at both ends and also has apertures 52 intermediate its ends and within the larger portion of the outer tube and the latter is completely closed except for an outlet 53 adjacent its outer end and at the bottom thereof and this outlet is preferably surrounded by a spout 54. When the pipe is in a substantially vertical position, the liquid in the outer chamber of the sleeve 35 will assume a position just below the flange 38 of the stem 37 and the spout 54 must be of sufficient length to project into the liquid in order to seal the passageway between the outer tube 51 of the condenser and the pipe stem, thus providing a liquid barrier against the direct passage of smoke from the pipe bowl to the smoker's mouth.

With the condenser assembled as shown in Fig. 1 it is necessary to temporarily close the outer end of the barrel 49 to prevent the smoke from travelling direct from the pipe bowl to the smoker's mouth and therefore I provide a stopper 55 which fits into the outer end of the barrel and may be held in place by the tube 56 projecting from the inner end of the mouthpiece 39 and communicating with the bore of said mouthpiece. The inner end of said tube 56 may be also temporarily closed by the stopper 55 and said tube has holes 57 through which smoke may pass from the interior of the stem 37 to the interior of said tube 56 on its way to the smoker's mouth.

In order to further cleanse the smoke during its passage through the pipe an absorbent filter cartridge 58 is placed within the inner chamber of the sleeve 35 and preferably on the inner projecting end of the barrel 49. This filter cartridge may be of any suitable absorbent material and is fashioned to provide a substantial body 59 having a passageway 60 therethrough, preferably of two different diameters so as to receive the barrel 49 and have an opening of about the same size as the passageway through said barrel. While the sleeve 35 is disengaged from the pipe the filter cartridge may be placed in position and the outer end of said cartridge has an overhanging projection 61 in the top surface of which is formed a groove 62 whereby a person may use his fingernail or some instrument to register with the groove to start the removal of the filter cartridge, after which the overhanging projection 61 may be grasped and the cartridge completely disengaged from the barrel 49, withdrawn from the sleeve 35 and discarded.

In practice, the separable element 36 of the purifier housing or casing is removed and the sleeve 35 then withdrawn. The contents of the liquid holding cartridge 43 is then emptied into the outer chamber of the sleeve with the cartridge inserted in the opening 42 and said cartridge clamped in position by means of the cap 46. The liquid in the purifier is trapped after reassembly of the parts, unless the pipe is violently shaken, so that if the pipe is placed in a vertical position with its mouthpiece uppermost the liquid will rest on the partition 41 below the open end of the cartridge 43, and if the pipe is placed in a vertical position with the pipe bowl uppermost the liquid will lie against the outer end of the purifier housing or casing below the flange 38, but if the quantity of liquid is such that it would reach beyond the open end of the cartridge 43, the excess will merely flow into the cartridge, or, when the pipe is in the other position, should the liquid level reach above the flange 38 it will merely flow into the stem 37 but the quantity will be insufficient to reach the holes 57 and therefore the liquid cannot enter the mouthpiece. When the pipe is in use it will be maintained in a substantially horizontal position, and the liquid will rest in what might be termed the bottom of the well, below the flange 38 and above the free end of the spout 54, and therefore the smoke from the burning tobacco will first enter the inner chamber of the sleeve 35 and contact with the absorbent filter cartridge 58 so that the smoke will give up much of its moisture, oils and other objectionable matter and will be further cleansed, purified, sweetened and cooled before passing into the stem 37, thence through the holes 57 into the tube 56 and finally through the bore of the mouthpiece 39 to the smoker's mouth and giving to the smoker a pure, cool, sweet smoke.

Many of the parts of the smoke purifier may be made of transparent materials in order that the operation of the purifier will be visible, and in addition, materials may be used such as are known on the market under the trade names of "Cellophane," "Hycoloid" and "Lucite," the latter particularly being clearer than optical glass and therefore transparent and colorless. Further, it is only about one-half of the weight of common glass, it is non-shatterable and is not inflammable in the ordinary sense.

It is to be particularly noted that the purifier herein described contains an absorbent filter cartridge and a liquid holding cartridge with each of the parts operatively disposed in the passageway of the pipe stem when considering all of the parts between the bowl and mouthpiece as the stem, and the same general theme or principles embodied in the invention are carried out in all of the several modifications of the invention.

Referring to Figs. 9 to 14 inclusive, 65 represents the bowl of the pipe provided with a tobacco chamber 66 and having a casing 67 projecting therefrom through which leads the draft opening 68. The outer end of this casing has a generally conical shaped socket or chamber at its outer end with a slight offset on one side to provide an irregular formation constituting a shoulder 70. In the socket is to be seated the generally conical shaped end of the absorbent filter cartridge 71 including a shell 72 of suitable low cost material such as paper, in which the body of absorbent material 73 is housed and held in place by a closure 74 mounted in the base end of the shell. The closure or shell has a hole 75 therethrough and may have a recess 76 adjacent the hole 75, both of which receive parts of the condenser to be presently described. The hole 75 aligns with a hole through the absorbent material 73 which in turn registers with a hole 77 in the apex of the filter cartridge and thereby provides a smoke passageway. This filter cartridge is provided with an offset 78 which engages the shoulder 70 so as to insure proper positioning of the filter cartridge in the socket 69 when the parts are assembled.

A hollow stem 79 is engaged over the end of the filter cartridge which projects from the socket of the casing and in said stem adjacent its outer end is a wall or partition 80 having a hole 81 therethrough and engaged with the outer end of the stem beyond the partition is the mouthpiece 82 having a bore which aligns with the hole 81. In the hole 81 is mounted the tube 83 projecting into the stem 79 and having holes 84 therein to provide communication between the interior of the stem and the interior of said tube.

In order to partially separate the inner and outer end portions of the stem from one another so that the liquid well is provided, similar to that previously described, a rib or barrier 79a is either formed with or attached to the stem or outer tube of the condenser and positioned within the stem at a suitable location intermediate the ends thereof. In this particular form of the invention, the condenser is illustrated as including a barrel or induction tube 85 normally open at both ends with lateral holes 86 in its side walls adjacent the outer end of said barrel, and in the region of said holes the barrel is surrounded by an outer tube 87, from the lower, outer end of which projects a tubular extension 88 having an outlet 89 adjacent its outer end, so that in effect, said condenser is the same as that shown in Figs. 1 and 4. The outer end of the barrel 85 projects into the hole 75 in the base of the filter cartridge, and the outer end of the tubular extension 88 projects into the recess 76, so that the outer end of said tubular extension is closed.

The barrel 85 is in endwise alignment with the tube 84 and the contiguous ends of these parts are preferably temporarily closed by the dual stopper 90, although other means may be used to close the ends of said barrel and tube.

With this construction, the filter cartridge and condenser may be so constructed that they are inseparable under ordinary conditions, thus providing a unitary structure which may be removed upon disconnection of the stem 79 from the housing or casing 67 of the pipe bowl and said unit discarded and replaced by a new one. In such a case it is to be understood that the parts of the condenser as well as the filter cartridge are to be constructed of low cost materials, but if the condenser is manufactured from material that should not be ordinarily discarded, then the filter cartridge can be separated therefrom and discarded, while the condenser may be cleaned and used again.

It is to be understood that while the pipe is in use and held in a generally horizontal position, the liquid in the stem will rest at the bottom of said stem between the rib or barrier 79a and the filter cartridge, in order to seal the outlet 89 so that the smoke from the burning tobacco must first pass through the filter cartridge and by a circuitous route through the condenser, through the outlet 89 and the liquid in the stem, finally passing through the openings 84 into the tube and through the bore of the mouthpiece to the smoker's mouth.

This will accomplish all of the objects set forth in connection with that form of the invention particularly illustrated in Fig. 1.

In Figs. 15 to 19 inclusive, I have shown what might be considered as a combination of the elements included in Figs. 1 and 9 with a slight rearrangement of the parts.

In this form of the invention 91 represents the pipe bowl with a tobacco chamber 92 and having a draft opening 93 leading therefrom and in communication with the element 94 of the housing or casing which element is carried by the pipe bowl.

The inner end of the sleeve 95 is inserted in the housing element 94 with the outer end of said sleeve projecting outside of the housing element to receive one end of the hollow stem 96 which forms another element of the housing or casing of the purifier. The sleeve 95 has a partition 97 intermediate its ends with a neck 98 projecting from one face of the partition and a lug 99 projecting from the opposite face, and through the neck, partition and lug is a passageway 100. A barrel 101 projects from the lug 99 and may be a separate element for attachment to the lug as shown in Fig. 15 or may be formed as an integral extension of the lug as shown in Fig. 18. This barrel has openings 102 in its side walls adjacent the outer end and is surrounded by an outer tube 103 the inner end of which fits over the lug 99 so that both ends of said outer tube are closed and the only exit therefrom is the outlet 104 through a spout 105 located adjacent the inner end of said outer tube and within the portion of the purifier that I have heretofore referred to as the well. In the present instance, the well is between the partition 97 within the sleeve and the rib or barrier 106 located in the lower part of the stem 96.

The outer end of the stem 96 is constructed to receive the liquid holding cartridge 107 which, when in place has its open end in contact with the gasket 108 which gasket rests against the shoulder 109 and the outer or closed end of said cartridge is engaged by the gasket 110 held in place by the mouthpiece 111 with a gasket 112 between the shoulder of the mouthpiece and the outer end of the stem 96. A tube 113 has one end mounted in the mouthpiece so that the interior of said tube is in communication with the bore of the mouthpiece and said tube extends through the gasket 110 and through the hole 114 in the closed end of the cartridge so that the inner end of said tube 113 is adjacent the outer end of the barrel 101. The adjacent open ends of said tube and barrel are temporarily closed by a dual stopper 115 which under certain conditions may also be used to close the opening 114 in the cartridge.

The cartridge 107 is to be primarily used for holding a quantity of liquid and in order to prevent said liquid from escaping, the open end of the cartridge is closed by the telescoping cover 116, Fig. 19. The cartridge with the liquid therein may be carried about in a person's pocket, purse or other container, and when it is to be used, the cover is removed and the cartridge inserted in the end of the stem. Then, by properly manipulating the pipe, the liquid will flow from the cartridge and into the well, at which time the stopper 115 may be removed from the outer end of said cartridge and either discarded or used to replace the stopper between the barrel and tube 113 when the mouthpiece is replaced. As the smoke from the burning tobacco must pass through the tube 113 from the stem 96 to the mouthpiece, said tube has holes 117 in its sidewalls adjacent the inner end of the tube.

A filter cartridge 118 of suitable absorbent material has a hole therethrough which registers with the neck 98 when said filter cartridge is placed in the inner end of the sleeve 95 and said filter cartridge has an overhanging extension 119 which may be grasped by the user of the pipe when said cartridge is to be removed therefrom and in order to assist the initial withdrawal movement, a groove 120 is provided in the outer surface of the overhanging part so that a person's fingernail or some instrument may be inserted therein. While the pipe is in use and held in a generally horizontal position, the smoke from the burning tobacco will enter the housing element 94 through the draft opening 93 and flow about the filter cartridge and through the opening in said cartridge so that certain undesirable elements may be absorbed, after which the smoke flows in a circuitous route through the barrel 101, then through the openings 102 into the outer tube 103, then flowing back towards the pipe bowl through the outer tube 103, then passing through the outlet 104 and through the liquid seal into the stem 96 and a part of the liquid holding cartridge 107 from where it will pass through the openings 117 into the tube 113 and finally through the bore of the mouthpiece into the smoker's mouth in a clean, cool and sweet condition.

In that form of the invention illustrated in Figs. 20 and 21, 121 represents the stem which is similar to that in the other forms of the invention, but in this particular instance the liquid holding cartridge 122 has a tube 123 which conveys the smoke to the mouthpiece formed as a part of said cartridge and preferably the outer end of said tube is permanently closed, as at 124, and inlet openings 125 leading to the interior of said tube are formed in the side walls thereof. This liquid holding cartridge is preferably of tubular formation with a partition 126 formed intermediate its ends and the tube 123 is formed with said partition, the latter having a hole 127 in alignment with the bore of the tube 123. The cartridge 122 is mounted in the outer end of the stem, the latter preferably having a shoulder with a gasket 128 between said shoulder and the inner end of the cartridge and the latter may be merely slipped into the stem or suitable holding means may be provided to temporarily retain it in place. As an example, one of the parts may have a nib 129 and the other part a bayonet slot.

A mouthpiece 130 is connected with the stem and for purposes of illustration, it is shown as having a reduced end which fits into one end of the liquid holding cartridge with a gasket 131 between the end of the mouthpiece and the partition 126 of the cartridge and also another gasket 132 between the outer end of the stem and the shoulder on the mouthpiece. When the mouthpiece is in place, the bore thereof is in endwise alignment with the bore of the tube 123.

In order that liquid may be held in the cartridge 122 until both are to be used, the hole 127 is temporarily plugged by a stopper 133 and a cover 134 is telescoped over that end of the cartridge from which the tube 123 projects as plainly shown in Fig. 21. The device is used in the same manner and for the same purposes as set forth in connection with the other forms herein described.

In Figs. 22 to 28 inclusive, I have illustrated my invention in connection with a cigar and cigarette holder, but it is to be understood that I do not limit this particular form of the invention, since the purifier may be used with any form of smoking device and the element which actually holds the tobacco is not actually a part of the invention.

The reference numeral 35 represents one element of the housing or casing having a chamber into which one end of the sleeve 136 is projected. This sleeve is similar to the ones illustrated in Figs. 15 and 18 and has a partition 137 intermediate its ends, with a lug 138 projecting from one side and a neck 139 projecting from the opposite side, and said neck, partition and lug have a hole passing therethrough in endwise alignment with the bore of the condenser barrel 140, the latter being carried by the lug and having holes 141 in its side walls adjacent the ends farthest removed from the lug. The outer tube 142 encloses said barrel and is fixed over the lug 138. The inner end of said outer tube has a hole 43 which aligns with the outer end of the bore of the barrel but the inner end of said barrel is sealed where it joins with the outer tube.

A chamber is formed where the sleeve 136 sets into the housing or casing 135 and in this chamber is placed a filter cartridge 144 of suitable absorbent material, said cartridge having a central hole through it for registration with the neck 139 and a similar neck 145 projecting from the inner wall of the housing or casing element 135.

The hollow stem 146 which constitutes the other element of the housing or casing slides over the projecting end of the sleeve 136 and a gasket 147 may be placed between the contiguous ends of the casing element 135 and the stem 146. Within the stem, at a suitable position intermediate its ends, is a rib or barrier 148 that provides a well to hold the purifying liquid and into which well leads outlet opening 149 from the interior to the outer tube 142, which opening passes through a spout 150.

In the outer end of the stem is removably mounted the mouthpiece 151 having side arms 152 projecting from its inner end and supporting a ring 153 at their outer ends. This construction provides an open frame or holder to receive the liquid holding cartridge 154 of cuplike formation with a hole 155 in the bottom thereof. This liquid holding cartridge has tapered side walls as plainly shown in Fig. 28 so that it may be wedged into the ring 153, but the length of said cartridge is such that when the outer edge of said cartridge is flush with the outer edge of the ring 153, the closed bottom of said cartridge will be placed a slight distance from the adjacent inner end of the mouthpiece. This will permit the insertion of a person's finger, a coin or other instrument between the bottom of the cartridge and the adjacent end of the mouthpiece to initially release the cartridge from the ring after which its outer end may be grasped between the fingers and completely removed.

The cartridge 154 is illustrated as provided with a tube 156 which is set in the hole 155 or otherwise connected with the cartridge and said tube projects toward and terminates adjacent the inner end of the barrel 140 when the cartridge is in place, so that said tube and the barrel may have their adjacent ends closed by the dual stopper 157 and said tube has openings 158 in its side walls adjacent its inner end to permit passage of smoke from the stem chamber into the tube on its way to the bore of the mouthpiece. Of course it will be obvious that instead of having the tube 156 formed with the cartridge, it may be made a part of the mouthpiece, the same as shown in Fig. 15 in which case the liquid holding cartridge 154 will be passed over the tube when being mounted in the ring 153.

The liquid holding cartridge is adapted to contain a certain quantity of liquid prior to being placed in the stem and in order to prevent said liquid leaking out of the cartridge, the hole 155 is closed by one of the dual stoppers 157 and the open end of the cartridge is closed by a cap 159 as shown in Fig. 23.

With the parts assembled as shown in Fig. 22 the smoke from the burning tobacco must travel through the absorbent filter cartridge 144 where certain objectionable products will be retained and thereafter the smoke will travel through the barrel 140 and through the openings 141 into the outer tube 142 and then flow back through the outer tube and through the opening 149 into the hollow stem where it must pass through the liquid in said stem to be further cleansed of its objectionable constituents and then it will be drawn through the openings 158 into the tube 156, finally entering the smoker's mouth through the bore of the mouthpiece.

When the liquid in the purifier has become contaminated to such an extent that it is desirable to remove the same, the purifier is tilted so that said liquid will flow into the liquid holding cartridge, after which the mouthpiece is removed and said cartridge partially withdrawn from the holding ring. The cap or cover from the fresh cartridge is then placed over the old cartridge and the latter thrown away. This prevents the smoker's fingers from becoming soiled and as the liquid is in the cartridge, said liquid cannot damage any property with which it might otherwise come in contact. A fresh cartridge is then inserted in the holding ring of the mouthpiece and the fresh liquid placed in the hollow stem, it being understood that the stopper in the hole 155 has been withdrawn, so that upon replacement of the mouthpiece the purifier will again be ready for use. It will be apparent that the parts can be so constructed that the liquid sealing medium may be put in and removed from the front, outer or tobacco end of the purifier instead of the rear, inner or mouthpiece end of the device.

In the arrangement of the parts illustrated in Figs. 29 to 32 inclusive, the reference numeral 160 designates a pipe bowl having a chamber 161 communicating with the interior of the casing which includes the element 162. The communicating passageway is restricted by the rib or barrier 163. A recess in the bottom of the pipe bowl adjacent the rib or barrier forms with the latter a well 164 for the retention of a certain amout of the liquid sealing substance. A tobacco bowl 165 is mounted in the pipe bowl in any suitable manner and has a smoke outlet 166 positioned adjacent the communicating passageway for the pipe bowl and casing.

A stem 167 has a portion connected to the casing element 162 and completes the casing as well as providing a connection for the mouthpiece 168. A tube 169 is carried by the mouthpiece and communicates with the bore of said mouthpiece. Holes 170 are formed in the side walls of the tube adjacent its outer end so as to lie within the stem but spaced from the inner end of the mouthpiece so that any liquid or foreign matter entering the stem cannot reach the bore of the mouthpiece and therefore cannot enter the smoker's mouth.

Preferably one end of the barrel 171 is temporarily connected to the tube 169 by a dual stopper 172 or other means so long as non-communication between the barrel element and the associated longitudinally aligned tube 169 is maintained. In other words, the tube 169 and the barrel 171 might be a single tube bored from both ends and leaving a partition or a plug can be forced into the tube and positioned in a proper location. The barrel 171 is open at its inner end and has side openings 173 intermediate its ends for the passage of smoke from the barrel 171 into the outer tube 174 which with the barrel forms the condenser and said outer tube has an outlet aperture 175. As will now be apparent, the mouthpiece, stem and condenser are joined as a unit for ordinary purposes but of course can be disassembled for cleaning the several elements.

The combined absorbent filter and liquid holding cartridge 176 consists of the sleeve 177 having a partition 178 intermediate its ends and carrying an absorbent filter cartridge 179 as well as a return tube 180 having an outlet orifice 181 at or adjacent its outer end. The sleeve, absorbent filter and return tube may be formed as an integral unit from suitable material or produced from separate parts and combined. By placing the tube 180 closer to the filter 179 than herein shown and providing a spout, similar to the showing in Figs. 1, 15 and 22, for the outlet orifice 181 the same results will be obtained and only a small quantity of liquid can enter the return tube 180. By elimination of the recess 164 and making chamber 161 deeper, tube 180 may be extended further into the chamber 161.

The inner end of the sleeve 176 is adapted to engage the barrier or rib 163 and while the upper portion of said sleeve is spaced from the barrier or rib 163, as may be ascertained from reference to Fig. 32, I also prefer to cut away a part of the inner end of the sleeve as at 182 so there will be no interference with the free passage of the smoke to and through the casing on its way to the mouthpiece and the smoker's mouth. Said sleeve 176 may be made tapered if so desired.

When not in the pipe one end of the sleeve is to be closed by a cap 183 having stoppers 184 and 185 for plugging the passages through the absorbent filter and the return tube respectively and the other end of said sleeve is to be closed by a cap 186 preferably having a slot 187 of a bayonet joint for registration with the pin 188 on the sleeve.

With the parts assembled as shown in Fig. 29, when the smoker draws on the pipe the smoke will pass into the absorbent filter 179 and be relieved of certain of its impurities. The smoke will next enter the outer tube 174 of the condenser through the barrel 171 and the holes 173 so that certain constituents may be precipitated and remain in the condenser. From the condenser the smoke will pass through the hole 175 directly into the return tube 180 and escape through the outlet orifice 181 for passage through the liquid seal in the well and thence through the casing into the tube 169 through the openings 170 and finally through the bore of the mouthpiece into the smoker's mouth. The well in this particular modification is of such form as to trap the sealing liquid so that a minimum amount may be used and even when the smoker tilts the pipe a sufficient quantity will remain in the well to assure the passage of the smoke through the liquid.

After the liquid has become contaminated it can be flowed into the inner end of the sleeve element of the combination cartridge and while some may enter the condenser through the return tube the amount will be very small and almost negligible. The pipe is inverted so the bowl is uppermost and then the stem with the condenser and combination cartridge withdrawn from the rest of the smoking appliance. The cap 186 is removed from a new cartridge and put on the used cartridge and then the part of the purifier with the mouthpiece on it is reversed or inverted so the mouthpiece is uppermost. The used cartridge is now removed and capped with the cap 183 from the new cartridge after the liquid contents of said new cartridge have been poured into the purifier. Naturally the tops of the cartridge caps are flat so that they may be set down on a flat surface and handled as desired.

It is to be particularly noted that the construction of the several forms of the invention all embody the use of a relatively small space for the liquid seal so that a very small amount of liquid is actually used in the purifier for efficiently accomplishing the desired results and all of the parts are so assembled that they may be readily detached and the liquid holding cartridge and the absorbent filter cartridge easily and quickly removed and replaced by new ones. And further, the parts which are not ordinarily to be removed may, when necessary or desirable, be easily disassembled for cleaning purposes and flushed out.

Of course I do not wish to be limited to the exact details of construction herein shown and described as these may be varied within the scope of the appended claims without departing from the spirit of my invention.

Having thus described my invention, what I claim as new and useful is:

1. In a smoke purifier, a smoking appliance having a casing with a tapered socket and an offset shoulder, an absorbent filter cartridge including a body of absorbent material, a shell surrounding said absorbent material and having a tapered end with an offset for insertion in the socket in only one position and a closure mounted in the base end of said shell, a stem fitted over that portion of the filter cartridge which projects from the socket, a barrier within the stem intermediate its ends to provide a liquid receiving chamber, a condenser located in said stem and comprising a barrel having one end communicating with the filter cartridge and provided with side openings adjacent the opposite end, an outer tube surrounding that portion of the barrel having the side openings therein, a small tube leading from said outer tube with an end set in the filter cartridge and closed thereby and said smaller tube having a bottom opening adjacent the filter cartridge leading to the liquid holding compartment, a mouthpiece mounted in the outer end of the stem, a tube having side openings and communicating with the bore of the mouthpiece and in endwise alignment with the barrel and means to temporarily close the contiguous ends of the said last named tube and the barrel.

2. A smoke purifier for a tobacco smoking appliance consisting of a housing containing condensing and discharge chambers with an outlet orifice from the condensing chamber to the discharge chamber sealed with liquid, an induction tube having an open end and a closed terminal end and a lateral port outlet that forms a communication between a tobacco bowl and the condensing chamber and an eduction tube having an open end and closed terminal end and a lateral port that forms a communication between the discharge chamber and the mouthpiece and said eduction tube carrying means for closing the terminal end of the induction tube.

3. A smoking appliance comprising an outer bowl, an inner bowl, a casing and a mouthpiece and containing condensing and discharge chambers and further provided with a well to receive a sealing liquid, an eduction tube attached to the mouthpiece and having side openings leading to the bore thereof at a distance from the mouthpiece, an induction tube for directing the smoke from the inner bowl to the condensing chamber, and a return tubular passageway extending from the said condensing chamber to the aforementioned well.

4. A smoking appliance comprising a bowl, stem and mouthpiece and containing condensing and discharge chambers, an eduction tube for directing smoke from the discharge chamber to the mouthpiece, a passageway from the condensing chamber leading towards the tobacco bowl, a spout in communication with said passageway, and a liquid seal for said spout.

5. A smoking appliance comprising a bowl, stem and mouthpiece and containing condensing and discharge chambers, an induction tube for directing smoke from the bowl to the condensing chamber, an eduction tube for directing smoke from the discharge chamber to the mouthpiece, a passageway from the condensing chamber leading towards the tobacco bowl and said passageway being located below the induction tube, a spout in communication with said passageway, and a liquid seal for said spout.

FRANCIS H. CULLEN.